United States Patent [19]
Hollnagel

[11] 3,866,724
[45] Feb. 18, 1975

[54] VARIABLE TWO-WAY SHOCK ABSORBER
[76] Inventor: Harold S. Hollnagel, 918 W. Laramie Ln., Milwaukee, Wis. 53217
[22] Filed: Aug. 13, 1973
[21] Appl. No.: 387,938

[52] U.S. Cl. .............. 188/129, 188/1 B, 267/9 B
[51] Int. Cl. ............................................. F16f 7/08
[58] Field of Search ............ 188/1 B, 129; 267/9 B, 267/9 C

[56] References Cited
UNITED STATES PATENTS
| | | | |
|---|---|---|---|
| 1,260,019 | 3/1918 | Oliver | 188/129 UX |
| 2,237,318 | 4/1941 | Snyder | 188/129 |
| 2,429,140 | 10/1947 | Snyder | 188/129 X |
| 2,507,760 | 5/1950 | Dath | 188/129 |

Primary Examiner—Duane A. Reger
Attorney, Agent, or Firm—McGlynn and Milton

[57] ABSTRACT

An energy absorbing device comprising: first and second relatively displaceable members adapted for independent connection to separate, external, relatively movable elements, friction means disposed between the members including a wedge surface defining a wedge angle and wedge means for engaging the surface and changing the wedge angle in proportion to the magnitude of the force urging movement between the members.

30 Claims, 6 Drawing Figures

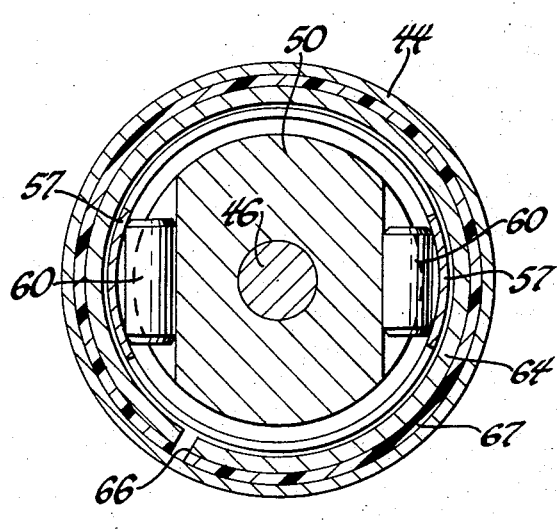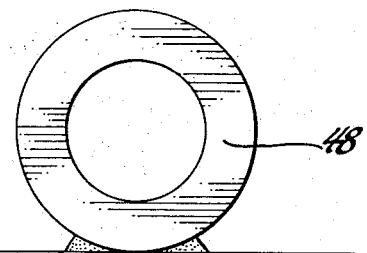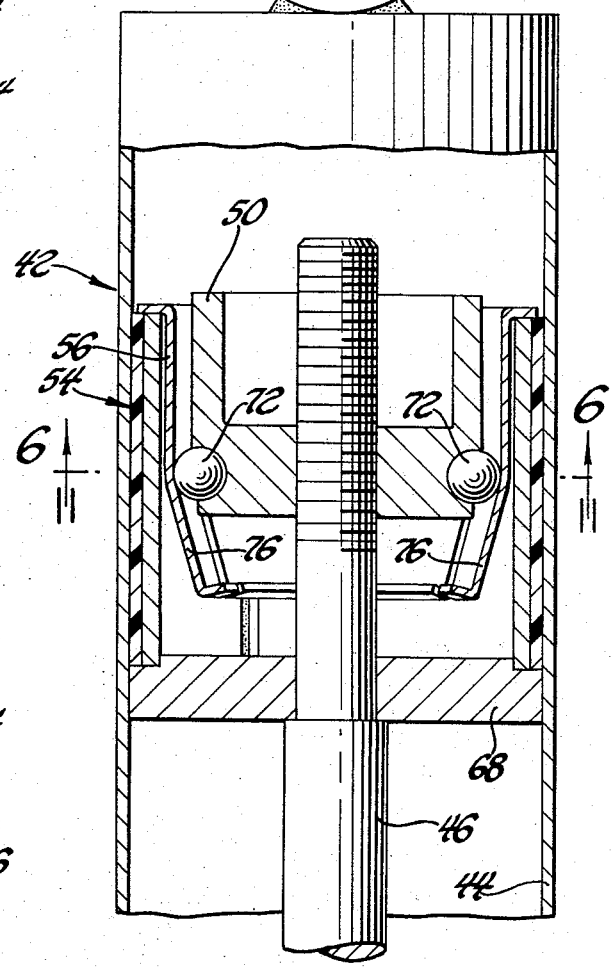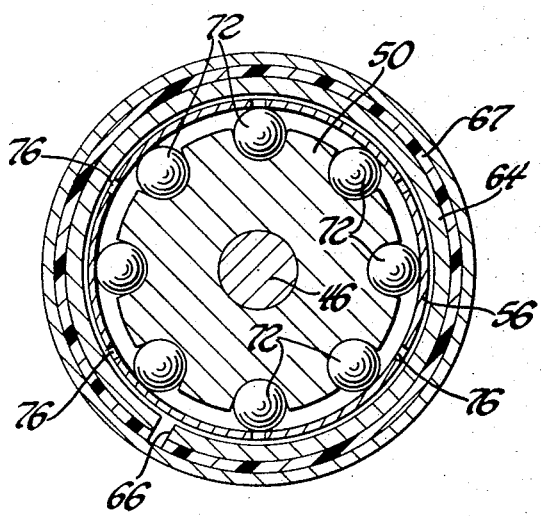

VARIABLE TWO-WAY SHOCK ABSORBER

INTRODUCTION

This invention relates to non-hydraulic shock absorbers of the friction type.

BACKGROUND OF THE INVENTION

The most common form of shock absorber involves a hydraulic cylinder and plunger, the housing of the cylinder and the plunger being separately connectable to external elements which are expected to undergo relative displacement. There are, however, many instances where a shock absorption or cushioning feature is called for, but where the relatively complex and expensive hydraulic shock absorber is ruled out for economic or other reasons. These instances include suspension system for recreational vehicles such as snowmobiles and anti-sway devices for trailers.

The most common and desirable substitute for the hydraulic shock absorber is an energy absorbing device of the frictional type which generally comprises a first member, such as a cylindrical housing, and a second member, such as a shaft or rod, coaxially disposed within the housing, and a friction pad assembly carried by the shaft in sliding engagement with the interior of the housing. In this arrangement, relatively slow acting displacement between the housing and shaft allows the friction pad assembly to be carried along with the shaft and to slide under relatively low friction conditions along the housing wall. The shaft, however, carries a wedge block in such a way that under abrupt displacement or shock displacement conditions, the friction pad assembly is pushed outwardly against the housing wall thereby to provide a high friction sliding relationship. In this way, the resistance to displacement between elements in the device to which the shock absorber is applied varies in accordance with the abruptness of the displacement producing force. However, in all assemblies heretofore employed the magnitude of the frictional engagement varies in a direct linear proportion to the distance traveled by the wedge block. In other words, the outward or radial displacement of the friction pad assembly is equal for any unit length traveled by the wedge block.

Friction type shock absorbers are disclosed in the U.S. patent to Bogard, U.S. Pat. No. 2,139,666, and also in the copending applications for U.S. Pat. Ser. No. 296,471, filed on Oct. 10, 1972 and Ser. No. 220,762, filed Jan. 26, 1972, these two patent applications being assigned to the assignee of this application.

BRIEF SUMMARY OF THE INVENTION

The present invention has for its primary objective the provision of a frictional shock absorber of improved response characteristics and, more particularly, a response characteristic which indicates a nonlinear relationship between shock force and the resistance to displacement, thus to approximate the response of a hydraulic shock absorber. In general, this is accomplished by including in the friction pad assembly a resilient actuator member which coacts with a wedge member to urge the friction pads into engagement with the walls of the housing member. The resilient actuator member is designed such that the outward or radial displacement of the friction pads increases with each successive unit length of movement by the wedge member. In this manner, the magnitude of the frictional engagement increases at an increasing rate with respect to the displacement of the shock absorber elements.

The instant invention also proivdes a shock absorber of the friction type which is wear resistant, inexpensive to manufacture and assemble, and one which requires a minimum number of parts. These and other features and attendant advantages of the instant invention will become apparent as the same becomes better understood by reference to the following detailed description when considered in connection with the accompanying drawings.

BRIEF DESCRIPTION OF THE DRAWINGS

FIG. 4 is a transverse full section view taken generally along line 4—4 of FIG. 3;

FIG. 5 is a cross sectional, partial view of another embodiment constructed in accordance with the instant invention; and FIG. 6 is a transverse, full section view taken generally along line 6—6 of FIG. 5.

DETAILED DESCRIPTION OF THE INSTANT INVENTION

Figure 1:
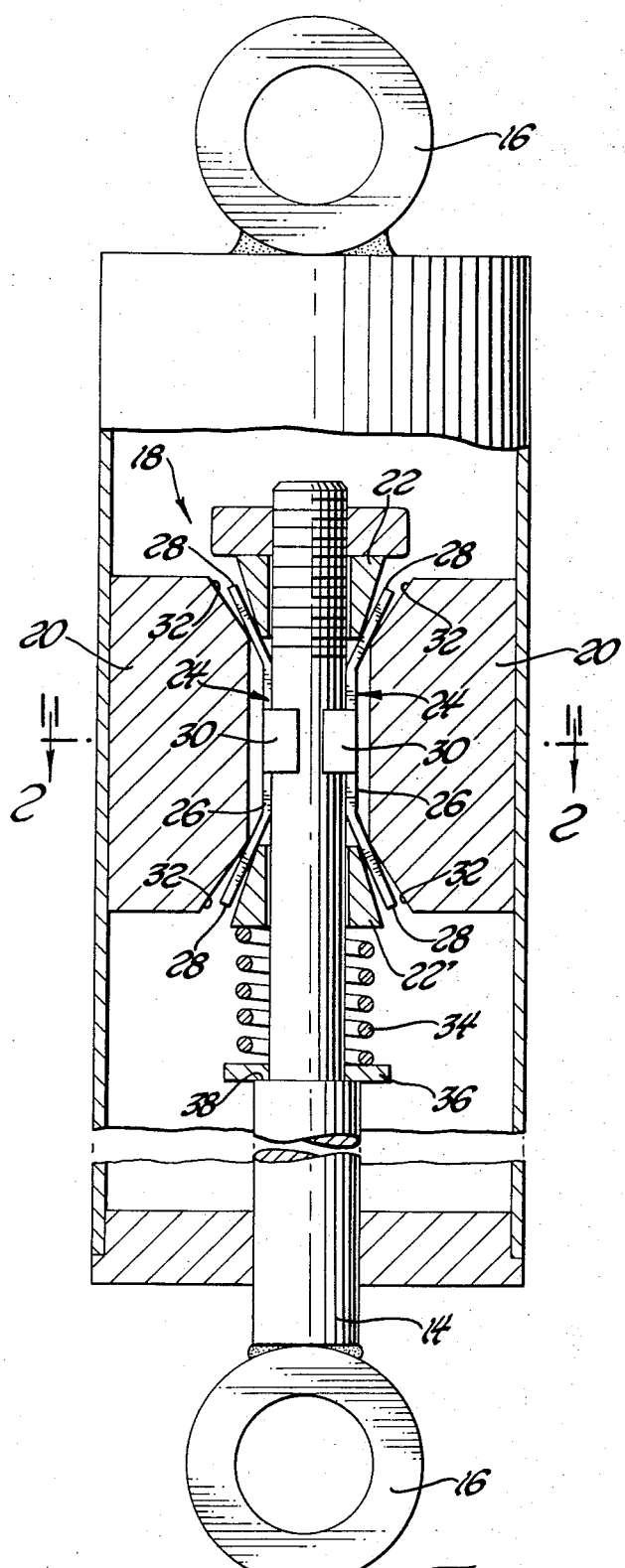
FIG. 1 is cross sectional elevational view of a preferred embodiment constructed in accordance with the instant invention.

Referring to FIG. 1, a friction type shock absorber constructed in accordance with the instant invention is generally shown at 10 and includes first and second relatively displaceable members, that is, a hollow cylindrical member 12 and a rod member 14, one end of which is disposed axially within the cylindrical member 12. Each of the relatively displaceable members are adapted for independent connection to separate external relatively movable elements between which displacement causing energy shocks are to be cushioned and dampened. To provide for such a connection the cylindrical member 12 and the rod member 14 each include an attachment ring 16 which is securely fastened thereto by welding or other suitable means. It is to be noted that means other than the attachment ring 16 may be provided which would serve the intended function with equivalent success.

Figure 2:
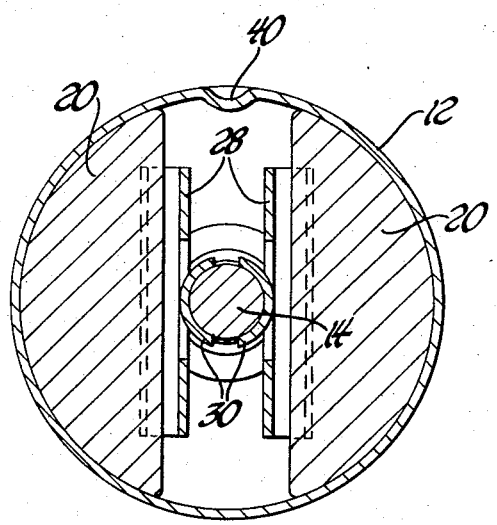
FIG. 2 is a transverse full section view taken generally along line 2—2 of FIG. 1.

The relative displacement of the rod 14 and the cylindrical member 12 is resisted by friction means generally shown at 18. The friction means 18 includes a pair of friction pad members 20 which include an arcuate outer surface which conforms to the inner walls of the cylindrical member as best shown in FIG. 2. The rod member 16 carries wedge means in the form of wedge elements 22 and 22'. The wedge elements 22 and 22' are substantially in the form of truncated cones and engage resilient actuating means generally indicated at 24 which in turn actuate the friction pad members 20.

The resilient actuating means 24 includes a pair of spring steel members each having an intermediate portion 26 extending longitudinally of the rod member 14 and angled portions 28 at each end thereof. The intermideate portion of the resilient actuating means 24 includes flange portions 30 for slidably engaging the rod member and thereby maintaining the resilient actuating means 24 in alignment therewith.

As best shown in FIG. 1, the friction pad members 20 include adjacent diverging walls 32 at each end thereof for defining inwardly tapered openings. The angled portions 28 extend into the tapered openings defined by the diverging walls 32 and are maintained substantially adjacent the same. Furthermore, the smaller ends of the wedge members 22 and 22' extend into the tapered openings and engage the angled portions 28 of the resilient actuating means 24.

The wedge element 22 at the distal end of the rod 14 is threadedly mounted thereon to enable its position to be adjusted longitudinally with respect to the rod member 14. This enables the initial loading or the initial frictional engagement of the friction pad members 20 with the walls of the cylindrical member 12 to be adjusted by rotating the rod member 14. To facilitate adjustment the second wedge element 22' is urged by means of a coil spring 34 into contact with the resilient actuating means 24 which in turn urges the friction pad members 20 radially outwardly. The coil spring 34 coacts between the wedge element 22' and a washer 36 which is seated against a shoulder 38 defined by the reduced portion of the rod member 14. The spring member 34 urges the wedge element 22' into engagement with the resilient actuating means and coacts with the other wedge element 22 to maintain an initial amount of frictional drag. As stated above, the amount of drag can be adjusted by rotating the rod member 14 and thereby threadedly moving the wedge element 22 along the length thereof. To prevent the friction pad members 20 from rotating with the rod member 14 a longitudinal depression 40 is disposed in the cylindrical member 12 to prevent rotation of the friction pad members 20 and, consequently, the resilient actuator means 24 and wedge element 22.

In operation, an abrupt relative displacement of the cylindrical member 12 and the rod member 14 causes one of the wedge elements 22 or 22' to move along the wedge surface defined by the angled portions 28 of the resilient actuating means 24. For example, an abrupt tensile force, tending to pull the rod member 14 out of the cylindrical member 12, will cause the wedge element 22 to move into the tapered opening defined by the diverging walls 32 of the brake pad members 20. Before such movement occurs, however, the angled portions 28 which provide the wedge surface defines a fixed wedge angle with respect to the wedge element 22. If the wedge angle remains fixed the resilient actuating means 24 will move the brake pad members 20 radially outwardly an equal distance for each unit length of travel of the wedge element 22 along the wedge surface. However, since the resilient actuating means 24 is elastically deformable the angled portions 28 flare outwardly toward the diverging walls 34 of the brake pad members 20 as they are forcefully engaged by the wedge element 22. Consequently, since the distance traveled by the wedge elment 22 increases with the force the wedge angle also changes in proportion to the magnitude of the force urging movement between the rod member 14 and the cylindrical member 12. Initial longitudinal movement of the wedge element 22 forces the resilient actuating means 24 and, therefore, the brake pad 20, outwardly into frictional engagement with the walls of the cylindrical member 12. However, a portion of the outward movement of the resilient actuating means 24 is lost due to the fact that the angled portions 28 are simultaneously being flared outwardly.

As the wedge elements 22 move farther along the wedge surface the angled portions 28 become less capable of flaring outwardly, due to the spring action of the resilient actuating means 24. Consequently, as the freedom of movement of the angles portions 28 declines, the radial displacement of the friction pad members 20 increases with each successive unit length of movement of the wedge element 22. At some point the angled portions 28 will no longer be capable of outward motion. This will occur when the spring action becomes too great or when the angled portions 28 solidly engage the diverging walls 32 of the friction pad members 20. When either of these conditions are attained the wedge angle of the wedge surface becomes fixed; however, it is noted that this wedge angle is much greater than the initial wedge angle defined by the engaged portions 28 prior to engagement by the wedge element.

In any event, it can be readily appreciated that the frictional engagement of the friction pad members 20 with the walls of the cylindrical member 12 increases per unit length of movement of the wedge element 22 as the wedge angle increases. Furthermore, since the wedge angle is increasing with every successive unit length of movement of the wedge element, the rate at which the magnitude of frictional engagement increases will also increase.

Figure 3:
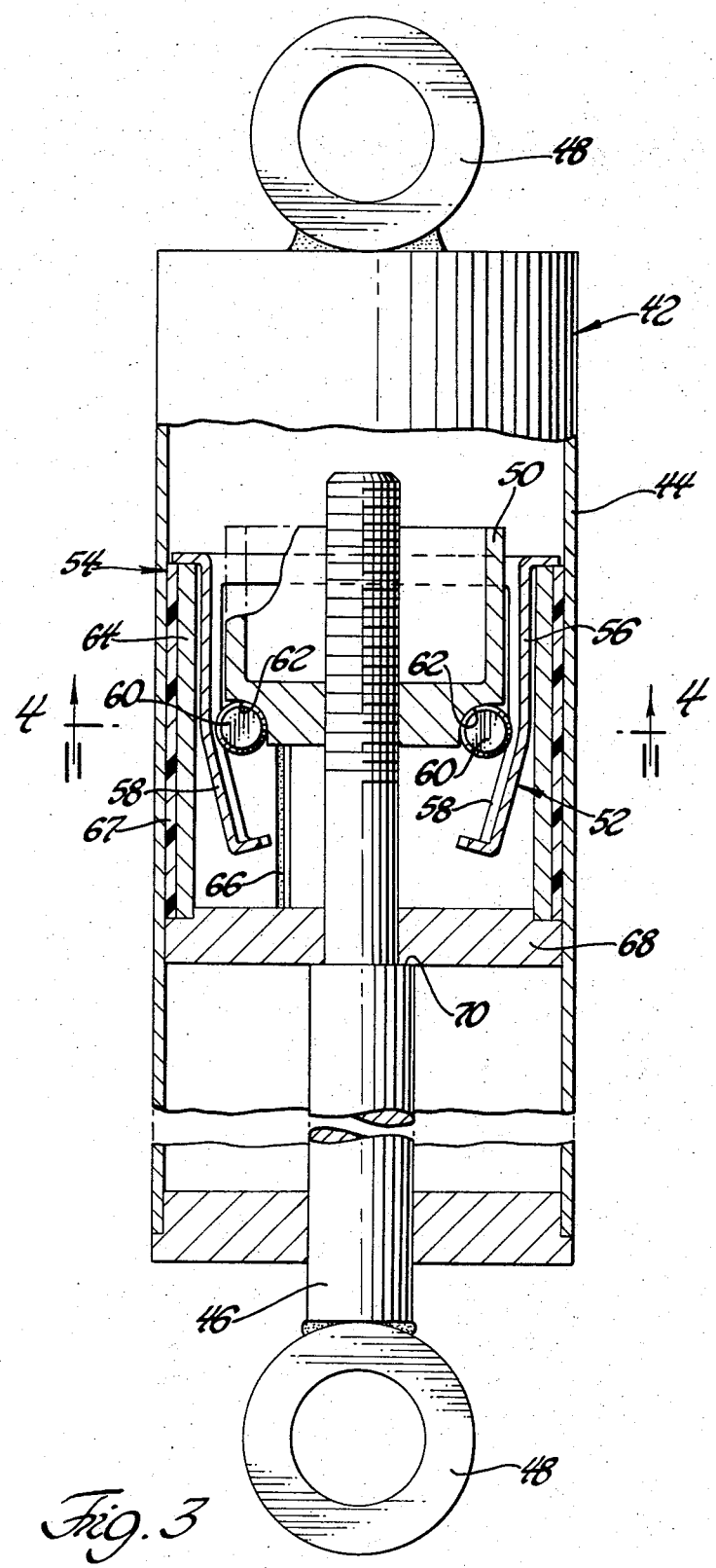
FIG. 3 is a cross sectional elevational view of an alternate embodiment constructed in accordance with the instant invention.

Referring now to FIGS. 3 through 6, alternate embodiments of an energy absorbing device of the instant invention are illustrated. Referring specifically to FIGS. 3 and 4 an energy absorbing device generally shown at 42 also includes a cylindrical member 44 and a rod member 46 having one end thereof disposed coaxially within the cylindrical member 44. Additionally, the rod member 46 and the cylindrical member 44 include attachment rings 48 for attachment to separate external, relatively movable elements. The rod member 46 is adapted to receive a wedge element 50 which coacts with a resilient actuating means generally indicated at 52 for urging friction means generally indicated at 54 into engagement with the walls of the cylindrical member 44. The resilient actuating means 52 includes an expansion sleeve member 56 having inwardly curved portions 58 defining the wedge surface. The expansion sleeve member 56 is comprised of at least two segments 57, as best shown in FIG. 4, separating the expansion sleeve member into longitudinally divided sections thereby enabling independent radial movement of the segments 57 upon actuation by the wedge means 50.

The wedge means 50 includes a substantially cylindrical member disposed within the expansion sleeve member 56 and adapted to move in response to the movement of the rod member 46. To enable adjustment of the initial frictional drag of the shock absorber the wedge means 50 is threadedly disposed on the rod member 46 such that rotation of the rod member 46 causes longitudinal movement of the wedge means 50 along the length thereof. The wedge means 50 also includes friction reducing means for facilitating movement of the wedge means along the wedge surface defined by the curved portions 58. In the preferred embodiment the friction reducing means includes a pair of suitable roller bearings 60 disposed in a bearing seat 62 in the wedge means.

The friction means 54 includes an expandable friction cylinder member 64 surrounding the expansion sleeve member 56. To allow expansion of the friction cylinder member 64 in response to the expansion of the expansion sleeve member 56, a longitudinal slot 66 is provided, as best shown in FIG. 4. To enhance the frictional engagement between the friction cylinder member 64 a coating of frictional material 67, such as Teflon, is provided.

It is noted that the embodiment of the shock absorbing device shown in FIGS. 3 and 4 is one directional, that is, frictional engagement with the walls of the cylindrical member 44 is produced only when the members are subjected to a tensile force. Consequently, means must be provided for returning the friction cylinder member 64 to the unactuated position subsequent to actuation by the wedge means 50 and the expansion sleeve member 56. The return means includes a circular plate member 68 disposed on the rod member 46 which is adapted to engage the end of the friction cylinder member 64. The circular plate member 68 seats against a shoulder 70 defined by a reduced portion along the rod member 46.

In operation, a tensile force tending to pull the rod member 46 out of the cylindrical member 44 will cause the wedge means 50 to move in the direction of the rod member 46 along the wedge surface defined by the inwardly curved portions 58. This movement causes the curved portions 58 to move radially outwardly as they are wedged apart by the wedge means 50. The expansion sleeve member 56 is thereby expanded, causing the friction cylinder member to expand and frictionally engage the walls of the cylindrical member 44. The wedge angle defined by the curved portions 58 changes as the wedge means 50 moves farther into the expansion sleeve member 56. As the wedge angle changes, the resistance against further outward movement of the curved portions 58 increases due to the spring action of the expansion sleeve member 56; consequently, an increasingly greater radial force is applied to the friction cylinder member 64 which increases the frictional engagement. As hereinbefore stated, the bearings 60 facilitate movement of the wedge means 50 along the wedge surface and prevent binding therebetween.

As the rod member 46 is pulled out of the cylindrical member 44 the friction cylinder member 54 moves in the same direction but obviously at a slower rate; therefore, when relative movement ceases the rod member 46, and consequently the wedge means 50, have been displaced relative to the friction cylinder member 54 and the resilient actuaring means 56. In other words, the circular plate 68 moves away from the friction cylinder member 54; however, when a compression stroke returns the rod member 46 to the unactuated position the circular plate engages the friction cylinder member 54 and moves it back to the initial unactuated position, as shown in FIG. 3.

Another embodiment of the instant invention is shown in FIGS. 5 and 6 which is similar to the embodiment shown in FIGS. 3 and 4. Similar numbers are employed in FIGS. 5 and 6 to denote similar parts as in FIGS. 3 and 4.

The embodiment shown in FIGS. 5 and 6 include friction reducing means comprised of a plurality of ball bearings 72 disposed in bearing seats about the periphery of the wedge element 50 in lieu of the roller bearings 60. As in the previously described embodiment the bearings 72 facilitate movement of the wedge element 50 with respect to the wedge surface.

Additionally, the expansion sleeve 56 is comprised of a plurality of segments 74 which encompass the wedge element 50 in contrast to the two-piece expansion sleeve comprised of the segments 57 in the previous embodiment. Each of the segments may be separated by a slot 76 or alternatively, some of the segments may be partially split adjacent their inwardly curved ends to facilitate radial expansion of the member 56. In any event, the operation of the embodiment shown in FIGS. 5 and 6 is substantially identical to that described hereinbefore.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that with the scope of the appended claims, the invention may be practiced otherwise than as specifically described.

The embodiments of the invention in which an exclusive property or privilege is claimed are defined as follows:

1. An energy absorbing device comprising: first and second relatively displaceable members adapted for independent connection to separate, external, relatively movable elements, friction means disposed between said members including at least one friction member, wedge means including a wedge member carried by one of said relatively displaceable members, resilient actuating means disposed between said friction member and said wedge member for moving said friction member into frictional engagement with the other of said relatively displaceable members, a wedge surface on said resilent actuating means defining a wedge angle engaged by said wedge member to change said wedge angle in proportion to the magnitude of force urging movement between said relatively displaceable members.

2. An assembly as set forth in claim 1 wherein said friction means includes friction pad members actuated by said resilient actuating means and said wedge means to frictionally engage one of said displaceable members upon relative movement between said displaceable members wherein said frictional engagement increases in proportion to the change in said wedge angle.

3. An assembly as set forth in claim 2 wherein said first relatively displaceable member comprises a hollow, cylindrical member, the inner walls of which are adapted to be engaged by said friction pad members.

4. An assembly as set forth in claim 3 wherein said second relatively displaceable member comprises a rod member, one end of which is disposed within said cylindrical member and which is adapted to receive said wedge means.

5. An assembly as set forth in claim 4 wherein said wedge means is threadedly movable longitudinally of said rod member.

6. An assembly as set forth in claim 5 wherein said cylindrical member and said rod member includes means for connecting the same to separate external relatively movable elements.

7. An assembly as set forth in claim 2 wherein said friction pad members include adjacent diverging walls at each end thereof for defining inwardly tapered openings.

8. An assembly as set forth in claim 7 wherein said friction pad members are held in contact with the walls of said cylindrical member by means of said resilient actuating means.

9. An assembly as set forth in claim 7 wherein said resilient actuating means includes angled portions extending into said tapered openings substantially adjacent said diverging walls.

10. An assembly as set forth in claim 9 wherein said wedge means includes first and second wedge elements disposed at opposite ends of said friction pad members in coacting proximity to said resilient actuating means.

11. An assembly as set forth in claim 10 wherein said first relatively displaceable member comprises a hollow, cylindrical member and said second relatively displaceable member comprises a rod member, said friction pad members engaging the inner walls of said cylindrical member and said wedge means being disposed on said rod member.

12. An assembly as set forth in claim 11 wherein said rod member includes spring means for urging said wedge elements into engagement with said resilient actuating means.

13. An assembly as set forth in claim 12 wherein said rod member includes a reduced portion defining a shoulder against which said spring means reacts.

14. An assembly as set forth in claim 13 wherein said rod member includes a washer member disposed between said spring means and said shoulder.

15. An assembly as set forth in claim 13 wherein said wedge elements are substantially in the form of truncated cones, the smaller ends of which are disposed within said inwardly tapered openings between said friction pad members.

16. An assembly as set forth in claim 15 wherein said resilient actuating means comprises a spring steel member having an intermediate portion extending longitudinally of said rod member and joining said angled portions.

17. An assembly as set forth in claim 16 wherein said intermediate portion of said resilient actuating means includes flange portions for slidably engaging said rod member to maintain said spring steel members in alignment therewith.

18. An assembly as set forth in claim 2 wherein said resilient actuating means includes an expansion sleeve member having inwardly curved portions defining said wedge surface.

19. An assembly as set forth in claim 18 wherein said expansion sleeve member includes a plurality of segments separating said expansion sleeve member into longitudinally divided sections thereby enabling independent radial movement of said segments upon actuation by said wedge means.

20. An assembly as set forth in claim 19 wherein said wedge means includes friction reducing means for facilitating movement between said resilient actuating member and said wedge means.

21. An assembly as set forth in claim 20 wherein said friction means includes an expandable friction cylinder member surrounding said expansion sleeve member, whereby expansion of said expansion sleeve member expands said friction cylinder member.

22. An assembly as set forth in claim 21 wherein said wedge means includes a substantially cylindrical member disposed within said expansion sleeve member and adapted to move in response to the movement of said relatively displaceable members.

23. An assembly as set forth in claim 22 wherein said first relatively displaceable member comprises a hollow cylindrical member, the inner walls of which are adapted to be engaged by said friction cylinder member.

24. An assembly as set forth in claim 23 wherein said second relative displaceable member comprises a rod member, one end of which is disposed within said cylindrical member and which is adapted to receive said wedge means.

25. An assembly as set forth in claim 24 wherein said wedge means is threadedly movable longitudinally of said rod member in response to the rotation of said rod member.

26. An assembly as set forth in claim 25 including return means for returning said friction cylinder member to the unactuated position subsequent to actuation by said wedge means and said expansion sleeve member.

27. An assembly as set forth in claim 26 wherein said return means includes a circular plate member disposed on said rod member and adapted to engage said friction cylinder member.

28. An assembly as set forth in claim 27 wherein said rod member includes a reduced portion defining a shoulder for coacting with said plate member to return said friction cylinder member to the unactuated position.

29. An assembly as set forth in claim 28 wherein said cylindrical member and said rod member include means for connecting the same to separate external relatively movable elements.

30. An assembly as set forth in claim 20 wherein said friction reducing means includes bearings and bearing seats associated with said wedge means, said bearings being seated in said bearing seats and engaging said wedge surface.

* * * * *